United States Patent Office 3,597,344
Patented Aug. 3, 1971

3,597,344
HIGH ENERGY RADIATION TREATMENT OF TALL OIL
Forrest N. Case, Oak Ridge, Tenn., assignor to the United States of America as represented by the United States Atomic Energy Commission
No Drawing. Filed May 10, 1968, Ser. No. 728,333
Int. Cl. B01j 1/10
U.S. Cl. 204—161HE                                    4 Claims

ABSTRACT OF THE DISCLOSURE

Highly energetic radiation has been found effective to reduce the Gardner color index of fatty acids derived from tall oil as well as other vegetable or animal sources. Additionally, the rate of crystallization of rosin acids is considerably inhibited by highly energized radiation.

BACKGROUND OF THE INVENTION

The invention described herein was made in the course of, or under, a contract with the U.S. Atomic Energy Commission.

The present invention relates to, and has for its principal object to provide, a method for improving the quality of fatty acids and rosin acids, particularly those derived from tall oil and to the products resulting from the improved process.

As used herein the term "tall oil" refers to a generic name for fatty acids and rosin acids obtained from the manufacture of wood pulp by the alkali sulfate process, or more popularly known as the Kraft process. The process of manufacturing tall oil to a final useful product is effected in a number of stages. The total process, the composition of intermediate products resulting from each stage, the chemistry of tall oil fatty and rosin acids as well as its end uses are described in Tall Oil and its Uses, a publication of the Tall Oil Products Division, Pulp Chemicals Association, edited by L. G. Zachary et al., published by the Information and Training Services Division, F. W. Dodge Company, a division of McGraw-Hill, Inc., 1965. The terms, definitions, and descriptions used in this book are hereby adopted and incorporated by reference.

The processing of crude tall oil by fractionation yields two major products, namely, fatty acids and rosin acids. The commercial utility of tall oil derived fatty acids and rosins depends to a large extent on the color, color stability, and odor of these products as they issue from the tall oil manufacturing process. The color of tall oil fatty acids and rosins is measured in the indutry by the so-called Gardner color index as described in ASTM specifications D803-61 and D509-55, respectively. The Gardner color index runs from a value of 1 to about 18. The most desirable tall oil fatty acids are those characterized by a minimum Gardner color index value. In the prior art attempts to minimize the undesirable color characteristics of fatty acid materials derived from tall oil have been made by contacting tall oil raw materials with clay, charcoal, by chromatographic techniques and by refining through distillation methods. Other methods have involved hydrogenation of the unsaturated fatty acids by various chemical reagents to improve stability to oxidation. All of these methods have had limited success in terms of producing a product having a satisfactorily low Gardner index. Fatty acids derived from vegetable sources such as from soya and cottonseed oil and from animal sources such as tallow present similar coloration problems, and it is a further object to provide a method which will effectively decolorize fatty acids derived from these sources.

In addition to color and odor problems, the tall oil industry has been plagued with a tendency of tall oil rosin to crystallize. The material will melt to liquid at about 100° C., but it will crystallize and solidify on prolonged heating below 140° C. The resulting product will then have a remelt temperature ranging from 50° C. to 100° C. higher than the original melting point.

SUMMARY OF THE INVENTION

With the foregoing statement of the problem in mind, I have discovered that the color of tall oil fatty acids can be considerably enhanced, the crystallizing tendency of tall oil rosins considerably reduced, and the odor of both tall oil fatty acids and rosin mixtures improved by the exposure of these products to highly energetic radiation preferably in a non-oxygen-containing atmosphere. By highly energetic radiation for the purposes of this invention, I mean to include exposure of tall oils to gamma rays such as those issuing from a cobalt-60 or a cesium-137 source, beta rays such as those issuing from $Sr^{90}$ $Y^{90}$ and high energy electrons such as those produced from accelerators to a total dosage sufficient to reduce the color and odor of tall oil products as well as to reduce the tendency of tall oil rosin to crystallize.

The effect of radiation in improving these physical characteristics of tall oil products will be illustrated in the following examples. In the examples, the specified compositions were exposed to radiation at room temperature (about 30° C.). The irradiated example experienced very little (less than about 5° C.) change in temperature over the dosage used to effect a color change.

EXAMPLE I

The starting material for this example was a fractionated tall oil specimen having the following composition in weight percent.

| | Percent |
|---|---|
| Palmitic acid | 1.8 |
| Palmitoleic acid | .9 |
| Stearic acid | 2.3 |
| Oleic | 38.8 |
| Linoleic (cis-9-cis-12) | 31.0 |
| Linoleic (cis-9-trans-11) | 5.4 |
| Linoleic acid (trans-9-trans-11) | 5.1 |
| Residue | ~14.0 |

This specimen was irradiated with gamma rays from a cobalt-60 and a cesium-137 source emitting gamma rays at a rate of approximately $4.3 \times 10^6$ roentgens per hour over a period of 3 hours. Color improvement as measured on the Gardner scale was observed to change from an original index of 6 before irradiation to 2 after 3 hours of irradiation. After 6 hours the color improved to an index of 1. The odor changed from a typically sharp tall oil odor to bland as the irradiation progressed.

EXAMPLE II

A high quality fatty acid fraction ("white" oleic) derived from tallow was irradiated for a 6-hour period with the gamma ray source described in Example I. The irradiated specimen was decolorized from the Gardner scale index of 1 to a "water white" color equivalent to the appearance of distilled water.

EXAMPLE III

A volume of fatty acid fraction derived from tallow was exposed to gamma irradiation for 1 hour at a rate of $4 \times 10^6$ roentgens per hour. The results are shown in Table I below.

TABLE I

| Time, min. | Exposed dose, r | Absorbed dose, R | Gardner scale | Transmission |
|---|---|---|---|---|
| 0 | 0 | 0 | 1 | |
| 60 | $4 \times 10^6$ | $3.6 \times 10^6$ | | 1.8 times that of unirradiated specimen. |

The color of the irradiated specimen was "water white," that is equivalent to distilled water, and as shown in Table I, exhibited an optical transmittance of nearly twice that of the unirradiated control specimen which had the very low Gardner color scale index of 1.

EXAMPLE IV

Several fractionated tall oil specimens were exposed for varying times to the gamma source described in Example I. Color change was observed and recorded as a function of radiation dose. The results are tabulated in Table II below.

TABLE II

| Run | Atmosphere | Time, hrs. | Exposed dose, r | Absorbed dose,[1] R | Gardner color scale |
|---|---|---|---|---|---|
| A | Air | 0 | 0 | 0 | 6 |
|  | Air | 24 | $1.4 \times 10^7$ | $1.3 \times 10^7$ | 3 |
|  | Air | 72 | $4.7 \times 10^7$ | $4.3 \times 10^7$ | 3 |
| B |  | 0 | 0 | 0 | 6 |
|  | Air | 8 | $4.8 \times 10^6$ | $4.3 \times 10^6$ | 5 |
|  | Vacuum | 1 | $1 \times 10^7$ | $8.9 \times 10^6$ | 2 |
| C | Air | 0 | 0 | 0 | 3 |
|  | Air | 2 | $1.2 \times 10^7$ | $1.0 \times 10^7$ | 1 |

[1] Absorbed dose means the dosage actually absorbed by the specimen as measured by Fricke dosimetry.

The color changes noted in Table II confirm the finding of previous examples in demonstrating the beneficial effect of irradiation in reducing the color of tall oil fatty acids.

EXAMPLE V

A crude tall oil specimen having the composition indicated below was irradiated with the radiation source described in Example I for 4 hours to a total absorbed dosage of $1.95 \times 10^6$ roentgens. The Gardner color scale index of the unirradiated sample was 9.5%. The irradiated sample had a Gardner scale color index of 3.

Fatty acids: Composition in weight percent
- Oleic _____ 54
- Stearic _____ 1.99
- Linoleic _____ 34.5
- Palmitoleic _____ 8.79
- Rosin and non-volatile _____ 12.3

EXAMPLE VI

Specimens of an irridated and unirradiated tall oil rosin material were melted at 150° C. The irradiated rosin melt was exposed to a dose of $6 \times 10^5$ roentgens per hour for 8 hours. Unirradiated as well as the irradiated specimens were melted at a temperature of 110° C. and held at temperature over a period of 13 days. The crystallizing tendency of the unirradiated and irradiated specimens is summarzed in the data presented in Table III below.

TABLE III

Degree of Crystallization of Rosins, percent [1]

| | Irradiated specimen | Unirradiated control specimen |
|---|---|---|
| Time at 110° C., days: | | |
| 1 | Trace | 10 |
| 2 | 1 | 100 |
| 3 | 5 | |
| 4 | 5 | |
| 5 | 10 | |
| 8 | 30 | |
| 13 | 50 | |

[1] Percent crystallization = weight crystals/weight sample $\times 100$.

It will be seen that the crystallinity of the irradiated rosin was fairly insignificant even after 5 days whereas the unirradiated control specimen was completely crystallized after only 2 days at temperature.

EXAMPLE VII

This example is designed to illustrate the relative color stability imparted to irradiated tall oil fatty acids.

A portion of a tall oil fatty mixture having a Gardner color index of about 9 was irradiated to a color index of 3. The irradiated and unirradiated portions were then heated in air at 110° C. for 1 hour. The color of irradiated and non-irradiated specimens was then measured and it was found that the color index of the unirradiated sample rose to 11 while the irradiated sample having a color index of 3 had changed to 6.

EXAMPLE VIII

Two samples of distilled tall oil were irradiated for 2 hours at $1.2 \times 10^7$ roentgens per hour. The color of the samples was changed from an original Gardner color index of 9 to 2 after irradiation. One of the irradiated samples was purged with nitrogen and the other left open to air for a period of 24 hours. After this time the color of the nitrogen-purged sample had changed to Gardner 3 while the air-exposed sample was Gardner 4. The effect of oxygen on the color of irradiated samples can be overcome by introducing anti-oxidants such as well-known benzoic acid derivatives used for this purpose.

It will thus be seen that the preceding examples, as specific embodiments, provide ample evidence to demonstrate the effectiveness of a high energy radiation in decolorizing fatty acid mixtures as well as reducing the tendency of tall oil derived rosin to crystallize. These beneficial effects can be realized simultaneously in many cases since tall oil products frequently consist of a mixture of fatty acids and rosin acids, or they may be realized separately in cases where a clean-cut separation of fatty acids and rosin acids has occurred prior to radiation. A specific radiation dosage cannot be stated with discrete accuracy since the effective dosage will vary according to the composition being treated in terms of its color and odor-containing fractions. However, the exact threshold dosage and effective dose range required to effect a change in color can, for a given tall oil sample, be easily determined by sight and smell as well as by standardized measurements.

While the beneficial effects of radiation to achieve the objects of this invention can be realized by exposing a tall oil sample in an ambient oxygen-containing atmosphere such as air, it is preferred to conduct the radiation in an inert (i.e., oxygen-free) atmosphere in order to avoid or reduce chemical reaction involving oxygen. Inert atmosphere such as vacuum, nitrogen or other inert gas will satisfy the preferred condition. And, while I have described my invention mainly in terms of tall oil derived fatty acids, I consider that the scope of my inventive concept and the benefits derived therefrom are applicable to and extend to the treatment of vegetable and animal derived fatty acids such as cottonseed and soya oil as well as tallow.

What is claimed is:

1. A method for treating tall oil which comprises irradiating said tall oil with high energy radiation sufficient to effect a reduction in the Gardner color index of said tall oil.

2. The method according to claim 1 in which the irradiation is conducted in an oxygen-free atmosphere.

3. A method for reducing the crystallizing tendency of tall oil derived rosin which comprises exposing said rosin to an effective dose of high energy radiation sufficient to reduce the crystallization rate of the rosin.

4. As a new composition of matter a tall oil rosin characterized in that its rate of crystallization on prolonged heating at a temperature between its melting point and 140° C. results in less than 50% crystallization.

References Cited

UNITED STATES PATENTS

| | | | |
|---|---|---|---|
| 2,990,346 | 6/1961 | Natkin et al. | 204—161 |
| 2,990,350 | 6/1961 | Natkin et al. | 204—162XHE |
| 3,112,252 | 11/1963 | Stoops et al. | 204—162HE |

BENJAMIN R. PADGETT, Primary Examiner

U.S. Cl. X.R.

204—162HE